(12) United States Patent
Kakinuma (10) Patent No.: US 12,122,135 B2
(45) Date of Patent: Oct. 22, 2024

(54) SHEET PEELING METHOD AND SHEET PEELING APPARATUS USING PEELING TOOL

(71) Applicant: DISCO CORPORATION, Tokyo (JP)

(72) Inventor: Yoshinori Kakinuma, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 94 days.

(21) Appl. No.: 18/048,962

(22) Filed: Oct. 24, 2022

(65) Prior Publication Data
US 2023/0127184 A1 Apr. 27, 2023

(30) Foreign Application Priority Data
Oct. 26, 2021 (JP) .................. 2021-174981

(51) Int. Cl.
*B32B 43/00* (2006.01)

(52) U.S. Cl.
CPC ........ *B32B 43/006* (2013.01); *B32B 2457/14* (2013.01); *B32B 2551/00* (2013.01); *Y10T 156/1168* (2015.01); *Y10T 156/1174* (2015.01); *Y10T 156/195* (2015.01)

(58) Field of Classification Search
CPC ............. B32B 43/006; Y10T 156/1168; Y10T 156/1174; Y10T 156/195
See application file for complete search history.

(56) References Cited

U.S. PATENT DOCUMENTS

| | | | | |
|---|---|---|---|---|
| 5,891,298 A | * | 4/1999 | Kuroda | H01L 21/67132 156/289 |
| 7,455,095 B2 | * | 11/2008 | Yamamoto | H01L 21/6835 156/289 |
| 7,798,195 B2 | * | 9/2010 | Kobayashi | H01L 21/6835 156/707 |
| 8,151,856 B2 | * | 4/2012 | Kawashima | H01L 21/67132 156/764 |
| 2007/0269962 A1 | * | 11/2007 | Kawashima | H01L 21/67132 438/464 |
| 2009/0065144 A1 | * | 3/2009 | Yamamoto | H01L 21/67132 156/763 |
| 2011/0155314 A1 | * | 6/2011 | Kobayashi | H01L 21/67132 156/349 |

FOREIGN PATENT DOCUMENTS

JP 2017123409 A 7/2017

* cited by examiner

*Primary Examiner* — Philip C Tucker
*Assistant Examiner* — Nickolas R Harm
(74) *Attorney, Agent, or Firm* — Greer Burns & Crain Ltd.

(57) ABSTRACT

A peeling tool includes a lower surface portion that is to be placed on a holding sheet affixed to a first surface of a workpiece, an upper surface portion corresponding to a second surface of the workpiece to which a protective sheet is affixed, and an abutting portion that has a shape conforming to an outer peripheral shape of the workpiece, that has a thickness corresponding to a thickness of the workpiece, and that is to abut on an outer peripheral portion of the workpiece. The upper surface portion has a width larger than a width of a peeling tape that is to be affixed to the protective sheet and used for peeling off the protective sheet, and is formed of a material that rejects affixing of the peeling tape. The lower surface portion is formed of a material that rejects affixing of the holding sheet.

8 Claims, 6 Drawing Sheets

SHEET PEELING METHOD AND SHEET PEELING APPARATUS USING PEELING TOOL

BACKGROUND OF THE INVENTION

Field of the Invention

The present invention relates to a sheet peeling method and a sheet peeling apparatus using a peeling tool.

Description of the Related Art

In a manufacturing process for manufacturing device chips by grinding and dividing a plate-shaped workpiece such as a semiconductor device wafer, a protective sheet such as an adhesive tape is affixed to the workpiece in order to prevent damage to the wafer and facilitate delivery of the chips obtained by the division. In the grinding, a protective sheet having a diameter the same as that of the workpiece is affixed to a device surface side of the workpiece. When the workpiece is to be divided into chips after the grinding, a holding sheet such as a dicing tape fixed at its outer periphery to an annular frame is affixed to a surface of the workpiece opposite to the device surface, and the protective sheet is peeled off from the workpiece (refer to Japanese Patent Laid-open No. 2017-123409, for example).

SUMMARY OF THE INVENTION

To peel off the protective sheet from the workpiece, a peeling tape is affixed to the protective sheet. By affixing the peeling tape to the protective sheet firmly over a range up to an outer peripheral edge of the protective sheet, the peeling can be carried out smoothly with an end portion of the protective sheet as a peeling initiation point. However, if the peeling tape is not affixed to the outer peripheral edge of the protective sheet, no peeling initiation point for peeling off the protective sheet is formed, and there is thus a problem that it is significantly difficult to carry out peeling. Meanwhile, when it is attempted to affix the peeling tape to the protective sheet firmly over a range up to the outer peripheral edge of the protective sheet, there is another problem that an adhesive surface of the peeling tape sticks to the holding sheet. To cope with the problems, conventionally, it is necessary to use a special, expensive tape which has no adhesive layer and which is affixed to the protective sheet when heated, as the peeling tape.

Accordingly, it is an object of the present invention to provide a peeling tool as well as a sheet peeling method and a sheet peeling apparatus using the peeling tool which are capable of suppressing the possibility that, when the peeling tape is to be affixed to the protective sheet firmly over a range up to the outer peripheral edge of the protective sheet, the adhesive surface of the peeling tape sticks to the holding sheet.

In accordance with an aspect of the present invention, there is provided a peeling tool for peeling off a protective sheet having a diameter substantially the same as a diameter of a plate-shaped workpiece from a second surface of the workpiece, the workpiece having a first surface fixed within an opening of an annular frame through a holding sheet and the second surface to which the protective sheet is affixed. The peeling tool includes a lower surface portion that is to be placed on the holding sheet, an upper surface portion corresponding to the second surface of the workpiece, and an abutting portion that has a shape conforming to an outer peripheral shape of the workpiece, that has a thickness corresponding to a thickness of the workpiece, and that is to abut on an outer peripheral portion of the workpiece. The upper surface portion has a width larger than a width of a peeling tape that is to be affixed to the protective sheet and used for peeling off the protective sheet, and is formed of a material that rejects affixing of the peeling tape. The lower surface portion is formed of a material that rejects affixing of the holding sheet.

In accordance with another aspect of the present invention, there is provided a sheet peeling method for peeling off a protective sheet having a diameter substantially the same as a diameter of a plate-shaped workpiece from a second surface of the workpiece with use of a peeling tool, the workpiece having a first surface fixed within an opening of an annular frame through a holding sheet and the second surface to which the protective sheet is affixed. The peeling tool includes a lower surface portion that is to be placed on the holding sheet, an upper surface portion corresponding to the second surface of the workpiece, and an abutting portion that has a shape conforming to an outer peripheral shape of the workpiece, that has a thickness corresponding to a thickness of the workpiece, and that is to abut on an outer peripheral portion of the workpiece. The upper surface portion has a width larger than a width of a peeling tape that is to be affixed to the protective sheet and used for peeling off the protective sheet, and is formed of a material that rejects affixing of the peeling tape. The lower surface portion is formed of a material that rejects affixing of the holding sheet. The sheet peeling method includes a workpiece holding step of holding the workpiece fixed to the frame on a chuck table through the holding sheet, a peeling tool disposing step of disposing, after the workpiece holding step is carried out, the peeling tool at a position nearest to the workpiece held on the chuck table to cover the holding sheet, a peeling tape affixing step of pressing the peeling tape having a large length to be affixed to the protective sheet, over an area ranging from a position on the protective sheet, the position being closer to a center with respect to an outer peripheral edge, to the peeling tool positioned nearest to the workpiece, thereby affixing the peeling tape to the protective sheet, and a peeling step of pulling the peeling tape affixed to the protective sheet in a direction from an outer periphery toward the center of the protective sheet, thereby peeling off the protective sheet from the workpiece. When the peeling tape is affixed to the protective sheet over a range up to an outermost peripheral portion of the protective sheet, the peeling tape is prevented from sticking to the holding sheet.

In accordance with a further aspect of the present invention, there is provided a sheet peeling apparatus for peeling off a protective sheet having a diameter substantially the same as a diameter of a plate-shaped workpiece from a second surface of the workpiece, the workpiece having a first surface fixed within an opening of an annular frame through a holding sheet and the second surface to which the protective sheet is affixed. The sheet peeling apparatus includes a chuck table for holding the workpiece on a holding surface thereof through the holding sheet, a peeling tool that is to be disposed at a position nearest to the workpiece held on the chuck table to cover the holding sheet, a supply unit that supplies a peeling tape to be affixed to the protective sheet, a pressing unit that presses the peeling tape over an area ranging from a position on the protective sheet, the position being closer to a center with respect to an outer peripheral edge, to the peeling tool positioned nearest to the workpiece, thereby affixing the peeling tape to the protective sheet, and a peeling unit that pulls the peeling tape affixed to the protective sheet, thereby peeling off the protective sheet from the workpiece. The peeling tool includes a lower surface portion that is to be placed on the holding sheet, an upper surface portion corresponding to the second surface of the workpiece, and an abutting portion that has a shape conforming to an outer peripheral shape of the workpiece, that has a thickness corresponding to a thickness of the workpiece, and that is to abut on an outermost peripheral portion of the workpiece. The upper surface portion has a width larger than a width of the peeling tape that is to be affixed to the protective sheet and used for peeling off the protective sheet, and is formed of a material that rejects affixing of the peeling tape. The lower surface portion is formed of a material that rejects affixing of the holding sheet. When the peeling tape is affixed to the protective sheet over a range up to an outermost peripheral portion of the protective sheet, the peeling tape is prevented from sticking to the holding sheet.

The present invention can suppress the possibility that, when the peeling tape is to be affixed to the protective sheet firmly over a range up to the outer peripheral edge of the protective sheet, the adhesive surface of the peeling tape sticks to the holding sheet.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Embodiments of the present invention will be described hereinbelow in detail with reference to the accompanying drawings. The present invention is not limited to the contents described in the embodiments below. Constituent elements described below include what is easily conceived by those skilled in the art and the equivalents thereof. Further, configurations described below can be combined as needed. Moreover, various omissions, replacements, and modifications of the configurations can be made without departing from the gist of the present invention.

First Embodiment

Figure 1:
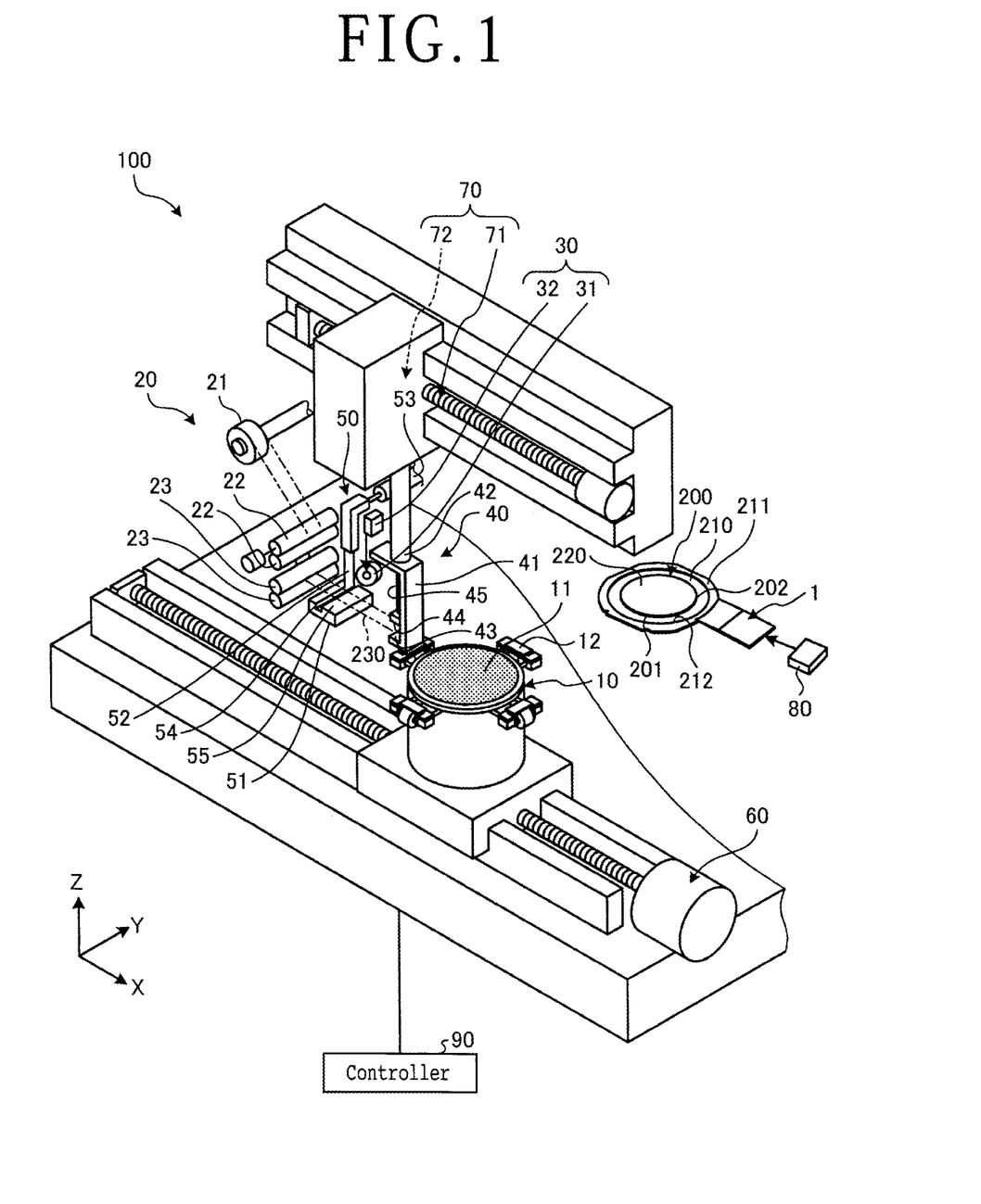
FIG. 1 is a perspective view of a configuration example of a sheet peeling apparatus according to a first embodiment.
Figure 2:
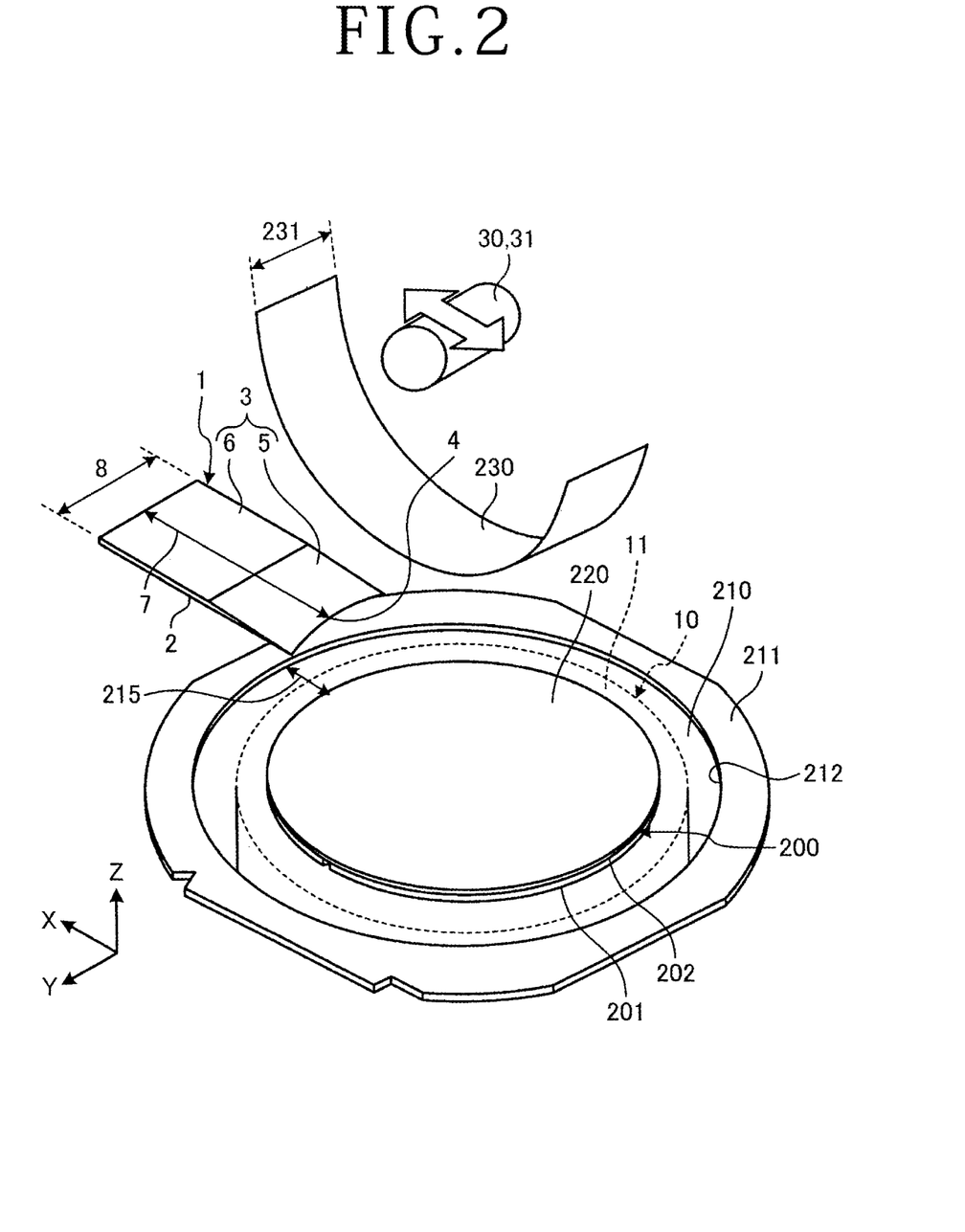
FIG. 2 is a perspective view of essential parts of the sheet peeling apparatus illustrated in FIG. 1.
Figure 3:
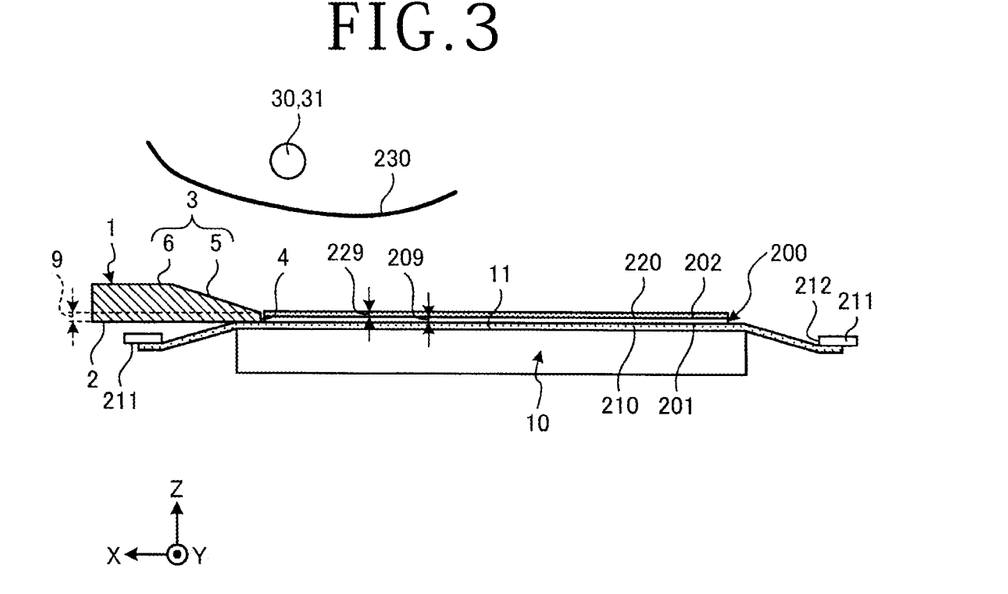
FIG. 3 is a cross-sectional view of essential parts of the sheet peeling apparatus illustrated in FIG. 1.

A sheet peeling apparatus 100 according to a first embodiment of the present invention will be described with reference to the accompanying drawings. FIG. 1 is a perspective view of a configuration example of the sheet peeling apparatus 100 according to the first embodiment. FIG. 2 is a perspective view of essential parts of the sheet peeling apparatus 100 illustrated in FIG. 1. FIG. 3 is a cross-sectional view of essential parts of the sheet peeling apparatus 100 illustrated in FIG. 1. The sheet peeling apparatus 100 includes a peeling tool 1 according to the first embodiment of the present invention, a chuck table 10, a supply unit 20, a pressing unit 30, a peeling unit 40, a cutting unit 50, a first moving unit 60, a second moving unit 70, a tool moving unit 80, and a control unit 90 as illustrated in FIG. 1.

In the first embodiment, a workpiece 200, from which the sheet peeling apparatus 100 is to peel off a protective sheet 220, is, for example, a disk-shaped semiconductor device wafer or an optical device wafer including silicon, sapphire, silicon carbide (SiC), gallium arsenide, or the like as a base material. The workpiece 200 has a first surface 201 to which a holding sheet 210 is affixed, and an annular frame 211 is mounted to an outer edge portion of the holding sheet 210. The workpiece 200 is thus fixed at its first surface 201 within an opening 212 of the annular frame 211 through the holding sheet 210. The workpiece 200 has a second surface 202 to which the protective sheet 220 is affixed.

In the first embodiment, the second surface 202 having a flat shape on a side opposite to the first surface 201 of the workpiece 200 is partitioned into a plurality of regions by a plurality of planned division lines (not illustrated) formed in a lattice manner, and devices (not illustrated) are formed in the respective regions. In other words, the second surface 202 corresponds to a device surface. However, the present invention is not limited to this example, and devices may not be formed. Examples of the devices formed on the workpiece 200 in the first embodiment include an integrated circuit (IC), a large-scale integration (LSI) circuit, or an image sensor such as a charge coupled device (CCD) or a complementary metal oxide semiconductor (CMOS). Further, the workpiece 200 in the present invention is not limited to a disk-shaped wafer and is only required to have a plate-like shape. For example, the workpiece 200 may be a rectangular plate-shaped package substrate, ceramic plate, or glass plate having a plurality of devices sealed with resin.

The holding sheet 210 in the first embodiment is, for example, a dicing tape including a base layer formed of synthetic resin and an adhesive layer, such as a paste layer, which has adhesiveness and is formed of synthetic resin. A side of the holding sheet 210 on which the adhesive layer is formed serves as an adhesive surface and is affixed to the first surface 201 of the workpiece 200 and the frame 211. When affixed to the first surface 201 of the workpiece 200 and the frame 211, the holding sheet 210 holds the first surface 201 of the workpiece 200 within the opening 212 of the frame 211. The holding sheet 210 has such a shape and a size that it can completely cover the first surface 201 of the workpiece 200 and the opening 212 of the frame 211 in a plane direction. It is to be noted that, in the present invention, the holding sheet 210 is not limited to the above example and may include thermoplastic resin which is to be heated and softened to be affixed to the first surface 201 of the workpiece 200 and the frame 211.

The protective sheet 220 in the first embodiment is, for example, an adhesive tape including a base layer formed of synthetic resin and an adhesive layer, such as a paste layer, which has adhesiveness and is formed of synthetic resin. A side of the protective sheet 220 on which the adhesive layer is formed serves as an adhesive surface and is affixed to the second surface 202 of the workpiece 200. It is to be noted that, in the present invention, the protective sheet 220 is not limited to the above example and may include thermoplastic resin which is to be heated and softened to be affixed to the second surface 202 of the workpiece 200. When affixed to the second surface 202 of the workpiece 200, the protective sheet 220 protects the second surface 202 of the workpiece 200.

The protective sheet 220 has a shape and a size substantially the same as those of the second surface 202 of the workpiece 200 in the plane direction. Here, the protective sheet 220 having a shape substantially the same as that of the second surface 202 of the workpiece 200 in the plane direction signifies, in the present specification, the protective sheet 220 having a shape conforming to an outermost peripheral edge of the second surface 202 of the workpiece 200 in the plane direction. In addition, the protective sheet 220 having a size substantially the same as that of the second surface 202 of the workpiece 200 in the plane direction signifies, in the present specification, the protective sheet 220 having a size the same as that of the second surface 202 of the workpiece 200 or a size slightly larger than that of the second surface 202 of the workpiece 200 within a predetermined error range in the plane direction. The protective sheet 220 in the first embodiment has a circular shape having a diameter substantially the same as that of the second surface 202 of the workpiece 200. That is, the protective sheet 220 has a diameter the same as that of the second surface 202 of the workpiece 200 or a diameter slightly larger than that of the second surface 202 of the workpiece 200 within a predetermined error range. In the first embodiment, for example, the diameter of the workpiece 200 is approximately 100 to 400 mm, and the predetermined error is approximately 5 mm or smaller.

The holding sheet 210 has a stronger adhesive force between itself and the workpiece 200 than the protective sheet 220. In other words, the adhesive force between the adhesive surface of the holding sheet 210 and the first surface 201 of the workpiece 200 is stronger than the adhesive force between the adhesive surface of the protective sheet 220 and the second surface 202 of the workpiece 200. Alternatively, the adhesive force of the protective sheet 220 may be made weaker than that of the holding sheet 210 by applying an external stimulus (ultraviolet radiation or heating, for example) before the protective sheet 220 is peeled off from the workpiece 200.

The sheet peeling apparatus 100 is an apparatus that carries out a sheet peeling method using the peeling tool 1 according to the first embodiment in the following manner. A peeling tape 230 is affixed to a surface of the protective sheet 220 opposite to the adhesive surface, the protective sheet 220 being affixed to the second surface 202 of the workpiece 200. The affixed peeling tape 230 is pulled by the peeling unit 40, and the protective sheet 220 is thus pulled through the peeling tape 230 in a direction separating from the workpiece 200, so that a peeling initiation point is formed at an outer peripheral edge where the peeling tape 230 is affixed, between the workpiece 200 and the protective sheet 220. From the peeling initiation point, the protective sheet 220 is peeled off from the workpiece 200. The surface to which the peeling tape 230 is to be affixed, that is, the surface of the protective sheet 220 opposite to the adhesive surface, the protective sheet 220 being affixed to the second surface 202 of the workpiece 200, will suitably be referred to as a "peeling tape affixed surface" hereinbelow.

In the first embodiment, the peeling tape 230 to be used when the sheet peeling apparatus 100 peels off the protective sheet 220 is, for example, a peeling adhesive tape including a base layer formed of synthetic resin and an adhesive layer, such as a paste layer, which has adhesiveness and is formed of synthetic resin. A side of the peeling tape 230 on which the adhesive layer is formed serves as an adhesive surface and is affixed to the peeling tape affixed surface of the protective sheet 220. An adhesive force between the adhesive surface of the peeling tape 230 and the peeling tape affixed surface of the protective sheet 220 is stronger than the adhesive force between the adhesive surface of the protective sheet 220 and the second surface 202 of the workpiece 200. The peeling tape 230 in the first embodiment is formed in the shape of a long belt having a width 231 as illustrated in FIG. 1 and FIG. 2. The peeling tape 230 is wound into a tape roll and supported by a reel 21 of the supply unit 20, is supplied by the supply unit 20, and is affixed by the pressing unit 30 to the peeling tape affixed surface of the protective sheet 220, and a predetermined length of the peeling tape 230 is cut out by the cutting unit 50. Here, the predetermined length is a length sufficiently longer in a longitudinal direction than a length over which the peeling tape 230 is affixed to the peeling tape affixed surface of the protective sheet 220 by the pressing unit 30. It is to be noted that, while the peeling tape 230 in the present invention may be a tape including thermoplastic resin which is to be heated and softened to be affixed to the peeling tape affixed surface of the protective sheet 220, it is preferable that a peeling adhesive tape having an adhesive layer be adopted as in the first embodiment. In this case, cost for preparing the peeling tape 230 can be reduced.

The peeling tool 1 according to the first embodiment has a lower surface portion 2, an upper surface portion 3, and an abutting portion 4 as illustrated in FIG. 2 and FIG. 3. The peeling tool 1, in the shape of a plate, has the lower surface portion 2 and the upper surface portion 3 formed as two surfaces intersecting a thicknesswise direction, and has the abutting portion 4 formed as one of surfaces intersecting a longitudinal direction. A side of the peeling tool 1 in the longitudinal direction on which the abutting portion 4 is formed will suitably be referred to as the "distal end side" hereinbelow, and a side of the peeling tool 1 in the longitudinal direction opposite to the side on which the abutting portion 4 is formed will suitably be referred to as the "proximal end side" hereinbelow. The peeling tool 1 has a length 7 in the longitudinal direction larger than a radial distance 215 between an inner peripheral edge of the frame 211 and the outer peripheral edge of the workpiece 200. The peeling tool 1 has a width 8 (length in a widthwise direction) larger than the width 231 of the peeling tape 230. The peeling tool 1 in the first embodiment has as its base material, for example, metal such as stainless steel.

The lower surface portion 2 is a surface that faces downward in a vertical direction (Z-axis direction), i.e., faces a −Z direction, and that is to be placed on the adhesive surface side of the holding sheet 210 affixed to the first surface 201 of the workpiece 200 held on the chuck table 10. The lower surface portion 2 has an anti-adhesive structure that rejects affixing of the adhesive surface of the holding sheet 210. Here, the lower surface portion 2 rejecting affixing of the adhesive surface of the holding sheet 210 means, for example, that the lower surface portion 2 is in a state in which the adhesive surface of the holding sheet 210 is hard to stick to it compared to a flat surface of the base material of the peeling tool 1. Especially, in the first embodiment, the adhesive surface of the holding sheet 210 is hard to stick to the lower surface portion 2, and even if sticking occurs, the adhesive force has a small value equal to or smaller than a predetermined threshold at which an operator can easily peel off the holding sheet 210 from the lower surface portion 2 by hand. While the lower surface portion 2 is a flat surface in the first embodiment as illustrated in FIG. 3, the present invention is not limited to this example. The lower surface portion 2 may have any shape that does not interfere with the frame 211 mounted to the workpiece 200 held on the chuck table 10.

The upper surface portion 3 is a surface that faces upward in the vertical direction, i.e., faces a +Z direction, and that corresponds to the second surface 202 of the workpiece 200 in a state in which the workpiece 200 is held on the chuck table 10 in such a manner that the second surface 202 to which the protective sheet 220 is affixed faces upward. Here, the upper surface portion 3 corresponding to the second surface 202 means the upper surface portion 3 constituting, together with the peeling tape affixed surface of the protective sheet 220 affixed to the second surface 202, a surface on which a roller 31 of the pressing unit 30 is to be moved to press the surface through the peeling tape 230 when the peeling tool 1 is placed at an abutting position to be described later. The upper surface portion 3 has a length in the widthwise direction (width 8) larger than the width 231 of the peeling tape 230. The upper surface portion 3 has an anti-adhesive structure that rejects affixing of the adhesive surface of the peeling tape 230. Here, the upper surface portion 3 rejecting affixing of the adhesive surface of the peeling tape 230 means, for example, that the upper surface portion 3 is in a state in which the adhesive surface of the peeling tape 230 is hard to stick to it compared to a flat surface of the base material of the peeling tool 1. Especially, in the first embodiment, the adhesive surface of the peeling tape 230 is hard to stick to the upper surface portion 3, and even if sticking occurs, the adhesive force has a small value equal to or smaller than a predetermined threshold at which the operator can easily peel off the peeling tape 230 from the upper surface portion 3 by hand.

The anti-adhesive structures of the lower surface portion 2 and the upper surface portion 3 in the first embodiment are each realized by adopting at least one of an anti-adhesive material that rejects affixing of the adhesive surface of the holding sheet 210 or the peeling tape 230 and an anti-adhesive shape that rejects affixing of the adhesive surface of the holding sheet 210 or the peeling tape 230. The anti-adhesive structures of the lower surface portion 2 and the upper surface portion 3 are each provided by, for example, coating processing with an anti-adhesive material such as Teflon (registered trademark), sandblast processing for forming an anti-adhesive shape such as a shape having a surface roughness of a predetermined value or more, or TOSICAL (registered trademark) processing for forming an anti-adhesive structure with enhanced anti-adhesive property by filling up an anti-adhesive shape, such as irregularities formed on the surface, with an anti-adhesive material such as special resin. Here, when the anti-adhesive property is strong, it means that the surface strongly rejects affixing of the adhesive surface of the holding sheet 210 or the peeling tape 230, that is, it means that the adhesive surface of the holding sheet 210 or the peeling tape 230 is hard to stick to the surface, and even if sticking occurs, the adhesive force is weak.

The upper surface portion 3 in the first embodiment includes an anti-adhesive weak area 5 and an anti-adhesive strong area 6. The anti-adhesive weak area 5 is formed on the distal end side in the upper surface portion 3, and the anti-adhesive strong area 6 is formed on the proximal end side in the upper surface portion 3. The anti-adhesive strong area 6 has an anti-adhesive property stronger than that of the anti-adhesive weak area 5. In the first embodiment, the anti-adhesive strong area 6 is formed to extend in parallel to the flat surface of the lower surface portion 2, and the anti-adhesive weak area 5 is formed to be tapered in such a manner that the thickness of the peeling tool 1 gradually decreases toward the distal end side. Since the peeling tool 1 includes the anti-adhesive weak area 5 and the anti-adhesive strong area 6 thus formed, the peeling tape 230 is slightly easier to stick to the anti-adhesive weak area 5 on the abutting portion 4 side than to the anti-adhesive strong area 6. Therefore, it is easy to affix the peeling tape 230 to the protective sheet 220 firmly over a range up to an outermost peripheral edge of the protective sheet 220. Alternatively, the peeling tool 1 itself may be formed of resin having non-adhesiveness such as Teflon (registered trademark).

The abutting portion 4 is a surface that intersects the longitudinal direction of the peeling tool 1, that has a shape conforming to an outer peripheral shape of the workpiece 200, i.e., in the first embodiment, conforming to an outer peripheral portion (outer peripheral edge or outer peripheral side surface) of the workpiece 200, that has a thickness 9 corresponding to a thickness 209 of the workpiece 200, and that is to abut on a part on a predetermined direction side (+X direction side in FIG. 1, in the first embodiment) of the outer peripheral portion of at least one of the workpiece 200 and the protective sheet 220. Since both the workpiece 200 and the protective sheet 220 have a disk-like outer peripheral shape in the first embodiment, the abutting portion 4 has a shape recessed in an arc in such a manner as to abut on the part on the predetermined direction side of the outer peripheral portion of the workpiece 200 and the protective sheet 220. As illustrated in FIG. 3 as well as FIG. 7 and the like to be described later, when the abutting portion 4 abuts on the part on the predetermined direction side of the outer peripheral portion of the workpiece 200 and the protective sheet 220, a small spacing is defined between the abutting portion 4 and the outer peripheral portion of the workpiece 200 and the protective sheet 220. With the spacing defined between the abutting portion 4 and the outer peripheral portion of the workpiece 200 and the protective sheet 220, the peeling tool 1 is suitably prevented from damaging the workpiece 200. Further, as illustrated in FIG. 3, the thickness 9 (length in the thicknesswise direction) of the abutting portion 4 in the first embodiment is equal to or smaller than a total thickness of the thickness 209 of the workpiece 200 and a thickness 229 of the protective sheet 220. More specifically, the thickness 9 is slightly smaller than the total thickness. Since the abutting portion 4 of the peeling tool 1 has the thickness 9 thus set, it is easy to affix the peeling tape 230 to the protective sheet 220 firmly over a range up to the outermost peripheral edge of the protective sheet 220.

The peeling tool 1 is connected on the proximal end side thereof with the tool moving unit 80 and can be moved in an X-axis direction and the Z-axis direction by the tool moving unit 80. The tool moving unit 80 moves the peeling tool 1 between the abutting position and a retracted position. The abutting position is a position nearest to the workpiece 200 held on the chuck table 10, that is, a position at which the abutting portion 4 abuts on the part on the predetermined direction side of the outer peripheral edge of the workpiece 200 held on the chuck table 10 and the protective sheet 220. The retracted position is a position retracted from the workpiece 200 held on the chuck table 10. When positioned at the abutting position, the peeling tool 1 covers a part on the predetermined direction side of the holding sheet 210 holding the workpiece 200, over a radial range from the inner peripheral edge of the frame 211 to the outer peripheral edge of the workpiece 200. It is to be noted that the peeling tool 1 in the present invention is not limited to this example, and instead of using the tool moving unit 80, the operator may move the peeling tool 1 between the abutting position and the retracted position by hand.

The chuck table 10 includes a disk-shaped frame body having a recess formed therein and a disk-shaped suction part fitted in the recess as illustrated in FIG. 1. The suction part of the chuck table 10 is formed of porous ceramic or the like and is connected with a vacuum suction source not illustrated through a vacuum suction path not illustrated. The suction part of the chuck table 10 has an upper surface serving as a holding surface 11 on which the workpiece 200 is to be placed and which holds the placed workpiece 200 under suction. In the first embodiment, the workpiece 200 is placed on the holding surface 11 in such a manner that the second surface 202 side to which the protective sheet 220 is affixed faces upward, and the first surface 201 side of the placed workpiece 200 is held under suction through the holding sheet 210. The holding surface 11 and an upper surface of the frame body of the chuck table 10 are flush with each other and are formed in parallel to an XY plane or a horizontal plane. The chuck table 10 can be moved by the first moving unit 60 in the X-axis direction, which is parallel to a horizontal direction, and can be rotated by a rotational drive source not illustrated about its central axis extending in the vertical direction, that is, extending perpendicularly to the holding surface 11 and in parallel to the Z-axis direction.

Further, the chuck table 10 includes a plurality of (four, in the example illustrated in FIG. 1) clamp-like frame holding portions 12 that are disposed at outer peripheral portions of the frame body as illustrated in FIG. 1 and that hold and fix the frame 211 mounted to the workpiece 200 through the holding sheet 210, in such a manner that an upper surface of the frame 211 is positioned at a height lower than the holding surface 11 in the vertical direction. Since the sheet peeling apparatus 100 holds and fixes the frame 211 with use of the frame holding portions 12 in such a manner that the upper surface of the frame 211 is positioned at a height lower than the holding surface 11 in the vertical direction as illustrated in FIG. 3, it is possible to prevent the flat lower surface portion 2 of the peeling tool 1 from interfering with the frame 211.

The supply unit 20 includes the reel 21 which is formed in a cylindrical shape and is rotatable about its central axis and around which the peeling tape 230 is wound into a tape roll, a pair of guide rollers 22, and a pair of feeding rollers 23 as illustrated in FIG. 1. The central axis of the reel 21 extends in parallel to the horizontal direction and also in parallel to a Y-axis direction orthogonal to the X-axis direction. A tension applying mechanism not illustrated applies to the reel 21 back tension for winding the peeling tape 230, and the tension is adjusted in the manner not generating slack in a drawn part of the peeling tape 230.

The guide rollers 22 guide the peeling tape 230 drawn from the reel 21 downward and are each formed in a cylindrical shape to be rotatable about its central axis. The pair of guide rollers 22 are disposed in parallel to each other, allow the peeling tape 230 to pass therebetween, fold back the peeling tape 230, and guide the peeling tape 230 downward while applying tension. The central axes of the guide rollers 22 extend in parallel to the Y-axis direction.

The feeding rollers 23 are disposed below the guide rollers 22 to feed the peeling tape 230, which has been guided by the guide rollers 22, toward the peeling unit 40 while causing the peeling tape 230 to pass above the holding surface 11 of the chuck table 10. The feeding rollers 23 are each formed in a cylindrical shape and are each rotatable about its central axis. The pair of feeding rollers 23 are disposed in parallel to each other, allow the peeling tape 230 to pass therebetween, and feed the peeling tape 230 toward the peeling unit 40. The central axes of the feeding rollers 23 extend in parallel to the Y-axis direction.

In this manner, the supply unit 20 supplies the peeling tape 230 to a position above the peeling tape affixed surface of the protective sheet 220 while adjusting the tension not to generate slack, in such a manner that the supplied peeling tape 230 extends substantially in parallel to the peeling tape affixed surface of the protective sheet 220 affixed to the workpiece 200 held on the chuck table 10, and in a state in which the adhesive surface of the peeling tape 230 faces the peeling tape affixed surface of the protective sheet 220 which is disposed on a lower side.

The pressing unit 30 includes a roller 31 and a roller driving section 32 as illustrated in FIG. 1. The roller 31 is connected with the roller driving section 32 and can be moved by the roller driving section 32 in the X-axis direction and the Z-axis direction. The roller 31 is moved by the roller driving section 32 between a pressing position at which the roller 31 presses down the peeling tape 230 that has been supplied by the supply unit 20 to the position above the peeling tape affixed surface of the protective sheet 220 and a retracted position retracted from the peeling tape 230. The roller driving section 32 can lower the roller 31 at the pressing position in the Z-axis direction, and while causing the roller 31 to rotate about its central axis extending in parallel to the Y-axis direction, cause the roller 31 to move in the X-axis direction in association with the rotation of the roller 31. The roller driving section 32 in the first embodiment includes, for example, known driving parts such as an air cylinder and a pulsed motor in combination.

In the first embodiment, the roller 31 positioned at the pressing position is rotated by the roller driving section 32 about its central axis extending in parallel to the horizontal direction. During and in association with the rotation, as illustrated in FIG. 2 and FIG. 3, the roller 31 presses down the peeling tape 230 while moving, with the peeling tape 230 interposed, along a path from a position on the peeling tape affixed surface of the protective sheet 220 affixed to the workpiece 200 held on the chuck table 10, the position being closer to the center with respect to the outer peripheral edge, through the outer peripheral edge of the protective sheet 220 to a position on the anti-adhesive weak area 5 of the upper surface portion 3 of the peeling tool 1. The roller 31 positioned at the pressing position may be caused to reciprocate along this path once or a plurality of times by the roller driving section 32. In this manner, the pressing unit 30 causes the roller 31 to affix the peeling tape 230 over an area ranging from the position on the peeling tape affixed surface of the protective sheet 220, the position being closer to the center with respect to the outer peripheral edge, to the outer peripheral edge. When the peeling tape 230 is affixed by the pressing unit 30, the peeling tool 1 prevents the peeling tape 230 from sticking to the holding sheet 210 holding the workpiece 200 thereon.

The peeling unit 40 pinches an end portion of the peeling tape 230 supplied by the supply unit 20 and includes a guide member 41 extending in the Z-axis direction orthogonal to both the X-axis direction and the Y-axis direction, an air cylinder 42 fixed to an upper end of the guide member 41, a fixed claw portion 43 formed by bending a lower end of the guide member 41, and a movable claw portion 44 that is disposed to face the fixed claw portion 43 and is supported by the guide member 41 in such a manner as to be movable in directions approaching and separating from the fixed claw portion 43. The peeling unit 40 extends a piston rod 45 of the air cylinder 42 to cause the movable claw portion 44 to approach the fixed claw portion 43, thereby pinching the end portion of the peeling tape 230. The peeling unit 40 retracts the piston rod 45 of the air cylinder 42 to cause the movable claw portion 44 to move away from the fixed claw portion 43, thereby releasing the pinching of the end portion of the peeling tape 230.

When the peeling tape 230 is supplied by the supply unit 20 and is affixed to the peeling tape affixed surface of the protective sheet 220 by the pressing unit 30, the peeling unit 40 functions as a supporting unit that pinches and supports the end portion of the peeling tape 230.

The peeling unit 40 is connected at a position above the air cylinder 42 with the second moving unit 70, and the second moving unit 70 can move the peeling unit 40 in the X-axis direction and the Z-axis direction. When the peeling unit 40 is moved by the second moving unit 70 in a direction toward the supply unit 20 in the state in which the end portion of the peeling tape 230 affixed to the protective sheet 220 is pinched, the peeling tape 230 is pulled in a direction separating from the workpiece 200, and the protective sheet 220 is pulled through the peeling tape 230 in the direction separating from the workpiece 200. As a result, a peeling initiation point is formed at the outer peripheral edge where the peeling tape 230 is affixed, between the workpiece 200 and the protective sheet 220, and the protective sheet 220 is thus separated from the workpiece 200.

The cutting unit 50 cuts the peeling tape 230 affixed by the pressing unit 30 and, in the first embodiment, cuts the peeling tape 230 at a position closer to the supply unit 20 than the portion of the peeling tape 230 affixed to the protective sheet 220. The cutting unit 50 is disposed between the supply unit 20 and the peeling unit 40 as illustrated in FIG. 1 and includes a placement base 51, a cutter blade 52, and a moving mechanism 53.

The placement base 51 has an upper surface 55 formed in a flat shape along the horizontal direction, and the peeling tape 230 is supplied by the supply unit 20 onto the upper surface 55. Further, the placement base 51 has a groove 54 that is recessed from the upper surface 55 and that linearly extends along the Y-axis direction.

The cutter blade 52 has a cutting edge with a length sufficiently longer than a thickness of the peeling tape 230 supplied onto the upper surface 55 of the placement base 51. The cutting edge of the cutter blade 52 faces the peeling tape 230 placed on the upper surface 55 of the placement base 51 and also faces the groove 54 extending in a direction (Y-axis direction) intersecting the longitudinal direction of the peeling tape 230. The moving mechanism 53 moves the cutter blade 52 along the direction in which the groove 54 extends. The cutting edge of the cutter blade 52 is moved by the moving mechanism 53 along the direction in which the groove 54 extends, thereby cutting the peeling tape 230 supplied onto the upper surface 55 of the placement base 51 along the direction in which the groove 54 extends. The moving mechanism 53 can move the cutter blade 52 in the Y-axis direction and the Z-axis direction. The moving mechanism 53 includes, for example, known driving parts such as an air cylinder and a pulsed motor in combination.

The first moving unit 60 is disposed below the chuck table 10 as illustrated in FIG. 1 and moves the chuck table 10 in the X-axis direction. In the first embodiment, the first moving unit 60 includes, for example, a known ball screw disposed to be rotatable about its central axis extending along the X axis, a known pulsed motor for rotating the ball screw about its central axis, and known guide rails supporting the chuck table 10 thereon in such a manner that the chuck table 10 can move in the X-axis direction.

The second moving unit 70 is disposed above the air cylinder 42 as illustrated in FIG. 1 and moves the peeling unit 40 in the X-axis direction and the Z-axis direction. The second moving unit 70 includes an X-axis moving unit 71 that moves the peeling unit 40 in the X-axis direction together with a Z-axis moving unit 72, and the Z-axis moving unit 72 that moves the peeling unit 40 in the Z-axis direction. In the first embodiment, the X-axis moving unit 71 includes, for example, a known ball screw disposed to be rotatable about its central axis extending along the X axis, a known pulsed motor for rotating the ball screw about its central axis, and known guide rails supporting the Z-axis moving unit 72 thereon in such a manner that the Z-axis moving unit 72 can move in the X-axis direction. The Z-axis moving unit 72 in the first embodiment includes, for example, known driving parts such as an air cylinder and a pulsed motor in combination.

The tool moving unit 80 is disposed on the proximal end side of the peeling tool 1 and moves the peeling tool 1 in the X-axis direction and the Z-axis direction. In the first embodiment, the tool moving unit 80 includes, for example, known driving parts such as an air cylinder and a pulsed motor in combination.

The control unit 90 controls operation of the respective constituent elements of the sheet peeling apparatus 100 to cause the sheet peeling apparatus 100 to carry out the sheet peeling method using the peeling tool 1 according to the first embodiment. The control unit 90 in the first embodiment includes a computer system. The computer system of the control unit 90 includes an arithmetic processing unit having a microprocessor such as a central processing unit (CPU), a storage unit having a memory such as a read only memory (ROM) or a random-access memory (RAM), and an input/output interface unit. The arithmetic processing unit of the control unit 90 executes arithmetic processing in accordance with a computer program stored in the storage unit of the control unit 90 and outputs control signals for controlling the sheet peeling apparatus 100 to the respective constituent elements of the sheet peeling apparatus 100 via the input/output interface unit of the sheet peeling apparatus 100.

Figure 4:
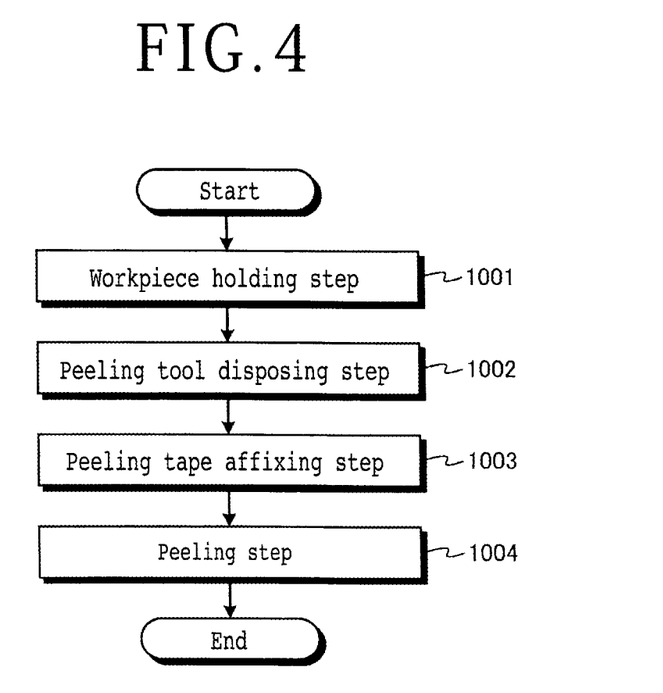
FIG. 4 is a flowchart illustrating a processing procedure of a sheet peeling method using a peeling tool according to the first embodiment.
Figure 5:
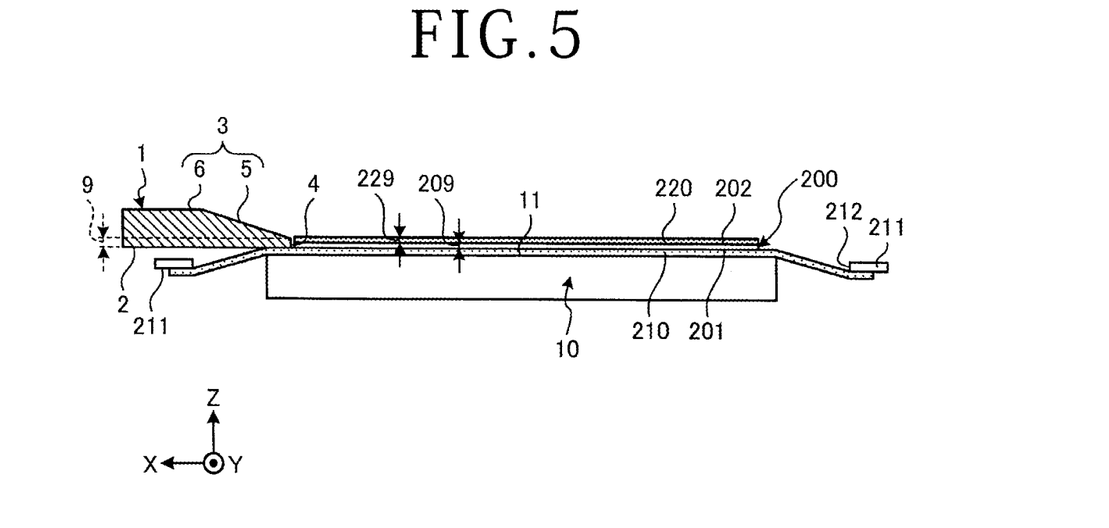
FIG. 5 is a cross-sectional view for describing a workpiece holding step and a peeling tool disposing step illustrated in FIG. 4.
Figure 6:
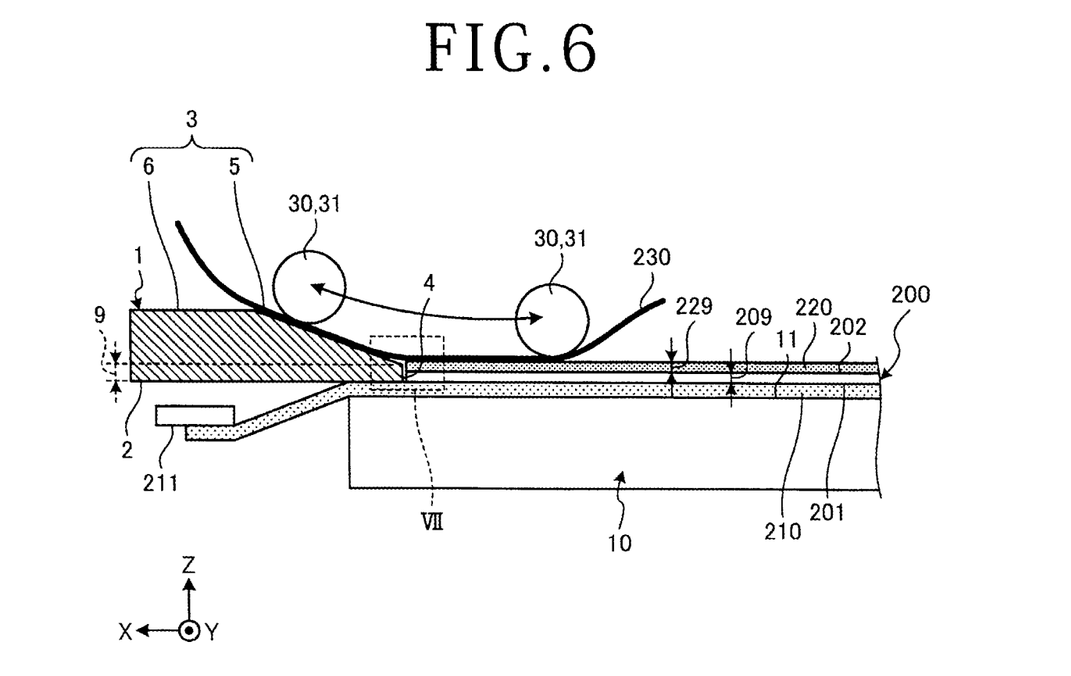
FIG. 6 is a cross-sectional view of essential parts for describing a peeling tape affixing step illustrated in FIG. 4.
Figure 7:
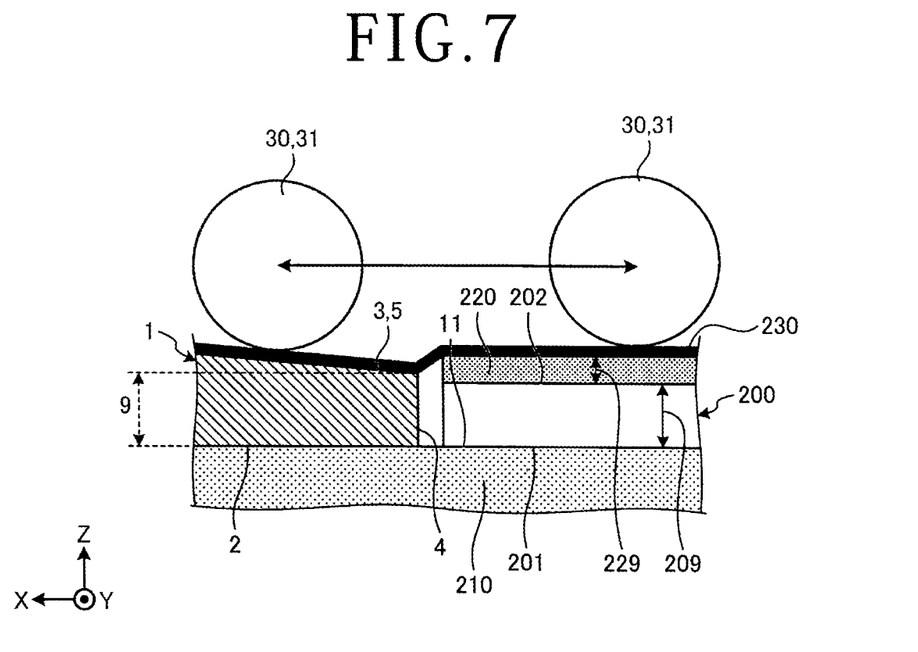
FIG. 7 is an enlarged cross-sectional view of essential parts illustrated in FIG. 6.
Figure 8:
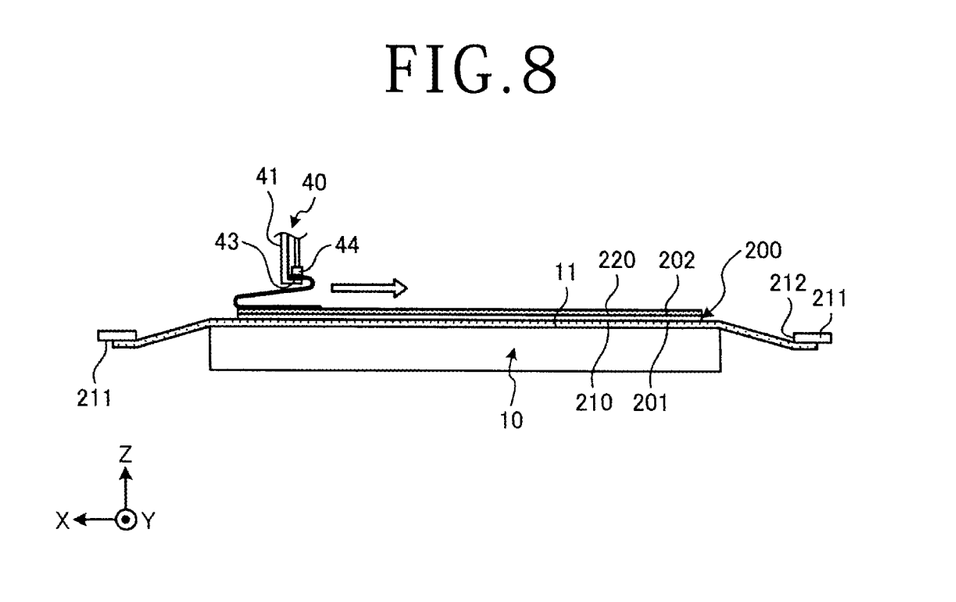
FIG. 8 is a cross-sectional view for describing a peeling step illustrated in FIG. 4.

Described next in the present specification with reference to the attached drawings is processing operation of the sheet peeling method using the peeling tool 1 according to the first embodiment. FIG. 4 is a flowchart illustrating a processing procedure of the sheet peeling method using the peeling tool 1 according to the first embodiment. FIG. 5 is a cross-sectional view for describing a workpiece holding step 1001 and a peeling tool disposing step 1002 illustrated in FIG. 4. FIG. 6 is a cross-sectional view of essential parts for describing a peeling tape affixing step 1003 illustrated in FIG. 4. FIG. 7 is an enlarged cross-sectional view of essential parts illustrated in FIG. 6. FIG. 8 is a cross-sectional view for describing a peeling step 1004 illustrated in FIG. 4. The sheet peeling method using the peeling tool 1 according to the first embodiment is an example of processing operation carried out by the sheet peeling apparatus 100 and includes the workpiece holding step 1001, the peeling tool disposing step 1002, the peeling tape affixing step 1003, and the peeling step 1004 as illustrated in FIG. 4.

In the workpiece holding step 1001, as illustrated in FIG. 5, the workpiece 200, which has the first surface 201 fixed within the opening 212 of the annular frame 211 through the holding sheet 210 and has the second surface 202 to which the protective sheet 220 is affixed, is held under suction on the holding surface 11 of the chuck table 10 through the holding sheet 210. In the workpiece holding step 1001, for example, the control unit 90 causes a delivery unit not illustrated to deliver the workpiece 200 stored in a cassette not illustrated onto the holding surface 11 of the chuck table 10, and causes the chuck table 10 to hold the delivered workpiece 200 under suction.

After the workpiece holding step 1001 is carried out, in the peeling tool disposing step 1002, as illustrated in FIG. 5, the peeling tool 1 is disposed at a position nearest to the workpiece 200 held on the chuck table 10 to cover a part on the predetermined direction side of the holding sheet 210 holding the workpiece 200, over a radial range from the inner peripheral edge of the frame 211 to the outer peripheral edge of the workpiece 200. More specifically, in the peeling tool disposing step 1002, the control unit 90 causes the tool moving unit 80 to position the peeling tool 1 at the abutting position at which the abutting portion 4 of the peeling tool 1 abuts on a part on the predetermined direction side of the protective sheet 220 of the workpiece 200 held on the chuck table 10.

After the peeling tool disposing step 1002 is carried out, in the peeling tape affixing step 1003, as illustrated in FIG. 6 and FIG. 7, the long peeling tape 230 to be affixed to the protective sheet 220 is pressed down by the roller 31 of the pressing unit 30 along a path from a position on the protective sheet 220 affixed to the workpiece 200 held on the chuck table 10, the position being closer to the center with respect to the outer peripheral edge, to a position on the anti-adhesive weak area 5 of the upper surface portion 3 of the peeling tool 1 located nearest to the workpiece 200, so that the peeling tape 230 is affixed to the protective sheet 220. More specifically, in the peeling tape affixing step 1003, the control unit 90 first causes the supply unit 20 to supply the peeling tape 230 to a position above the protective sheet 220 and then causes the peeling unit 40 to pinch and support the end portion of the supplied peeling tape 230. In the peeling tape affixing step 1003, next, the control unit 90 causes the roller driving section 32 of the pressing unit 30 to move the roller 31 positioned at the pressing position in the X-axis direction while pressing down the supplied peeling tape 230, thereby affixing the peeling tape 230 to the protective sheet 220 over an area ranging from the position on the peeling tape affixed surface of the protective sheet 220, the position being closer to the center with respect to the outer peripheral edge, to the outer peripheral edge (outermost peripheral portion). In the peeling tape affixing step 1003, the control unit 90 then causes the cutter blade 52 of the cutting unit 50 to cut the peeling tape 230 affixed to the protective sheet 220, at a position on a side opposite to the side of the end portion pinched by the peeling unit 40, along the direction (Y-axis direction) intersecting the longitudinal direction of the peeling tape 230.

In the peeling tape affixing step 1003, when the peeling tape 230 is to be affixed to the protective sheet 220 over the range up to the outermost peripheral portion of the protective sheet 220, the peeling tool 1 rejects affixing thereto of the peeling tape 230 and prevents the peeling tape 230 from sticking to the holding sheet 210 holding the workpiece 200. In addition, in the peeling tape affixing step 1003 in the first embodiment, as illustrated in FIG. 7, the thickness 9 of the abutting portion 4 of the peeling tool 1 is slightly smaller than the total thickness of the thickness 209 of the workpiece 200 and the thickness 229 of the protective sheet 220. Accordingly, the peeling tape 230 is pressed by the roller 31 with a stronger force at the outer peripheral edge of the protective sheet 220, so that the peeling tape 230 is firmly affixed to the outer peripheral edge of the protective sheet 220.

In the peeling step 1004, as illustrated in FIG. 8, the peeling tape 230 affixed to the protective sheet 220 is pulled in a direction from the outer peripheral side toward the center of the protective sheet 220, thereby peeling off the protective sheet 220 from the workpiece 200. More specifically, in the peeling step 1004, the control unit 90 causes the second moving unit 70 to move the peeling unit 40 in the direction toward the supply unit 20 while keeping the state in which the end portion of the peeling tape 230 is pinched by the peeling unit 40 in the peeling tape affixing step 1003, the peeling tape 230 is thus pulled in the direction separating from the workpiece 200, and the protective sheet 220 is pulled through the peeling tape 230 in the direction separating from the workpiece 200. As a result, a peeling initiation point is formed at the outer peripheral edge where the peeling tape 230 is affixed, between the workpiece 200 and the protective sheet 220, and the protective sheet 220 is thus peeled off from the second surface 202 of the workpiece 200.

According to the peeling tool 1 as well as the sheet peeling method and the sheet peeling apparatus 100 using the peeling tool 1 of the first embodiment described above, when the peeling tape 230 is to be affixed to the protective sheet 220, the peeling tool 1 covers the holding sheet 210 at the corresponding part of the outer periphery of the workpiece 200, so that the peeling tool 1 suppresses the possibility that the adhesive surface of the peeling tape 230 sticks to the holding sheet 210. In addition, the peeling tape 230 is pressed over a range up to a position on a radially outer side with respect to the outer peripheral edge of the protective sheet 220, and therefore, the peeling tape 230 is firmly affixed to the protective sheet 220 over the range up to the outer peripheral edge of the protective sheet 220. As a result, when the peeling tape 230 is pulled, a peeling initiation point can easily be formed at the outer peripheral edge where the peeling tape 230 is affixed, between the workpiece 200 and the protective sheet 220.

Further, according to the peeling tool 1 as well as the sheet peeling method and the sheet peeling apparatus 100 using the peeling tool 1 of the first embodiment, the peeling tape 230 is prevented from sticking to the holding sheet 210 since the peeling tool 1 covers the holding sheet 210 at the corresponding part of the outer periphery of the workpiece 200. Accordingly, the cost can be reduced compared to a case using, as the peeling tape 230, a tape including thermoplastic resin which is to be heated and softened to be affixed, and a peeling adhesive tape having strong adhesiveness can suitably be used. According to the peeling tool 1 as well as the sheet peeling method and the sheet peeling apparatus 100 using the peeling tool 1 of the first embodiment, the peeling adhesive tape is used as the peeling tape 230, and therefore, it is possible to further remarkably suppress the possibility that the adhesive surface of the peeling tape 230 sticks to the holding sheet 210 and to reduce the cost for preparing the peeling tape 230.

Further, according to the peeling tool 1 as well as the sheet peeling method and the sheet peeling apparatus 100 using the peeling tool 1 of the first embodiment, the length 7 of the peeling tool 1 in the longitudinal direction is larger than the radial distance 215 between the inner peripheral edge of the frame 211 and the outer peripheral edge of the workpiece 200, and the width 8 of the peeling tool 1 is larger than the width 231 of the peeling tape 230. Therefore, it is possible to further securely prevent the peeling tape 230 from extending outside the peeling tool 1 and sticking to the holding sheet 210. Further, according to the peeling tool 1 as well as the sheet peeling method and the sheet peeling apparatus 100 using the peeling tool 1 of the first embodiment, the thickness 9 of the abutting portion 4 of the peeling tool 1 is equal to or smaller than the total thickness of the thickness 209 of the workpiece 200 and the thickness 229 of the protective sheet 220. Therefore, the peeling tape 230 can be pressed with a stronger force at the outer peripheral edge of the protective sheet 220, so that the peeling tape 230 can firmly be affixed to the protective sheet 220 over a range up to the outer peripheral edge of the protective sheet 220.

Further, according to the peeling tool 1 as well as the sheet peeling method and the sheet peeling apparatus 100 using the peeling tool 1 of the first embodiment, the lower surface portion 2 of the peeling tool 1 has a structure that rejects affixing of the adhesive surface of the holding sheet 210. Therefore, the peeling tool 1 can smoothly be placed at the abutting position at which the lower surface portion 2 makes contact with the adhesive surface of the holding sheet 210, and can easily be retracted to the retracted position. Further, according to the peeling tool 1 as well as the sheet peeling method and the sheet peeling apparatus 100 using the peeling tool 1 of the first embodiment, the upper surface portion 3 of the peeling tool 1 has a structure that rejects affixing of the adhesive surface of the peeling tape 230. Therefore, it is possible to reduce the possibility that the peeling tape 230 sticks to the upper surface portion 3 of the peeling tool 1, and the peeling tool 1 can easily be retracted to the retracted position after the peeling tape 230 is affixed to the protective sheet 220.

Further, according to the peeling tool 1 as well as the sheet peeling method and the sheet peeling apparatus 100 using the peeling tool 1 of the first embodiment, the upper surface portion 3 of the peeling tool 1 has the anti-adhesive weak area 5 and the anti-adhesive strong area 6, and the peeling tape 230 is slightly easier to stick to the anti-adhesive weak area 5 on the abutting portion 4 side than to the anti-adhesive strong area 6. Therefore, the peeling tape 230 can further firmly be affixed to the protective sheet 220 over a range up to the outer peripheral edge of the protective sheet 220.

Second Embodiment

Figure 9:
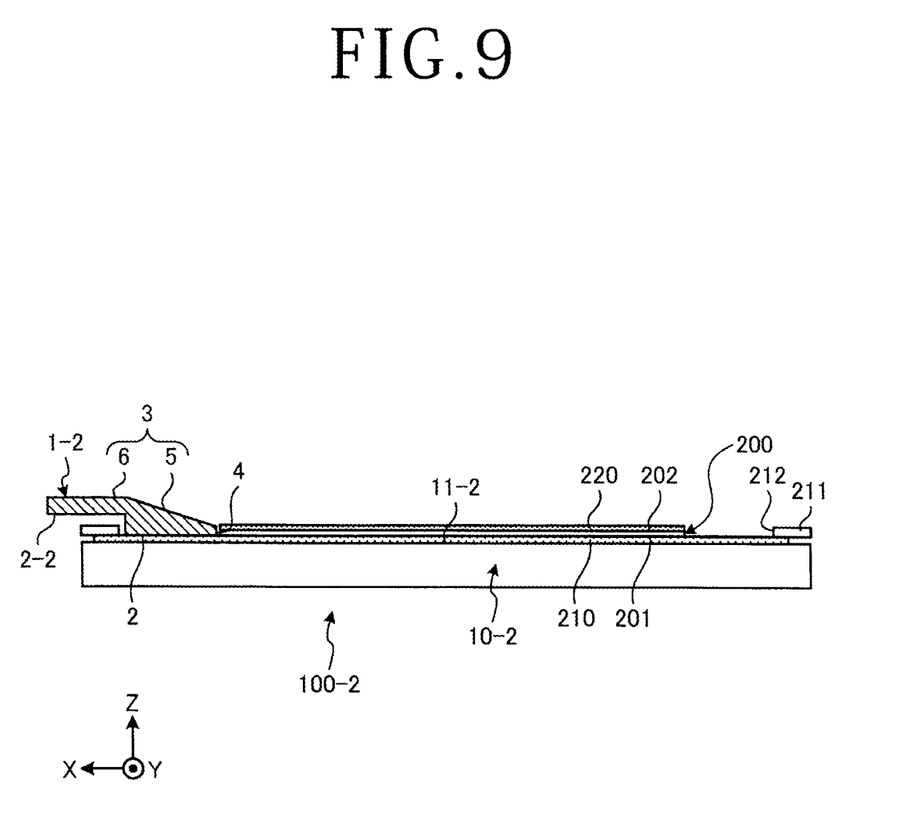
FIG. 9 is a cross-sectional view of a peeling tool and essential parts of a sheet peeling apparatus according to a second embodiment.

A peeling tool 1-2 as well as a sheet peeling method and a sheet peeling apparatus 100-2 using the peeling tool 1-2 according to a second embodiment of the present invention will be described hereinbelow with reference to the accompanying drawings. FIG. 9 is a cross-sectional view of the peeling tool 1-2 and essential parts of the sheet peeling apparatus 100-2 according to the second embodiment. In FIG. 9, constituent elements the same as those of the first embodiment are denoted by the same reference symbols, and redundant description thereof will be omitted.

As illustrated in FIG. 9, the sheet peeling apparatus 100-2 according to the second embodiment is different from the sheet peeling apparatus 100 according to the first embodiment in that the peeling tool 1 is replaced by the peeling tool 1-2 and that the chuck table 10 is replaced by a chuck table 10-2. The chuck table 10-2 is different from the chuck table 10 of the first embodiment, as illustrated in FIG. 9, in that the holding surface 11 is replaced by a holding surface 11-2 having a larger diameter and that the frame holding portions 12 are omitted. The chuck table 10-2 holds under suction the workpiece 200 and the frame 211 mounted to the workpiece 200 on the holding surface 11-2 through the holding sheet 210.

The peeling tool 1-2 is obtained by forming a clearance recess 2-2 in the lower surface portion 2 of the peeling tool 1. The clearance recess 2-2 is formed at a position corresponding to the frame 211 mounted to the workpiece 200 held on the holding surface 11-2 of the chuck table 10-2 when the peeling tool 1-2 is positioned at the abutting position, in such a shape as to have a width larger than a radial width of the frame 211 and a depth larger than a thickness of the frame 211. Since the peeling tool 1-2 has the clearance recess 2-2 formed therein, it is possible to suppress interference of the lower surface portion 2 with the frame 211 mounted to the workpiece 200 held on the holding surface 11-2 of the chuck table 10-2.

The sheet peeling method using the peeling tool 1-2 according to the second embodiment is different from that of the first embodiment in that the sheet peeling apparatus 100 is replaced by the sheet peeling apparatus 100-2. The peeling tool 1 is replaced by the peeling tool 1-2, and the workpiece 200 is held by the chuck table 10-2 in place of the chuck table 10. The sheet peeling method according to the second embodiment is the same as that of the first embodiment in other respects.

The peeling tool 1-2 as well as the sheet peeling method and the sheet peeling apparatus 100-2 using the peeling tool 1-2 of the second embodiment described above are different from those of the first embodiment in that the peeling tool 1 is replaced by the peeling tool 1-2 having the clearance recess 2-2 formed in the lower surface portion 2 thereof and that the chuck table 10 is replaced by the chuck table 10-2 from which the frame holding portions 12 are omitted. Accordingly, the second embodiment provides operation and advantageous effects the same as those provided by the first embodiment.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A peeling tool for peeling off a protective sheet having a diameter substantially the same as a diameter of a plate-shaped workpiece from a second surface of the workpiece, the workpiece having a first surface fixed within an opening of an annular frame through a holding sheet and the second surface to which the protective sheet is affixed, the peeling tool comprising:
    a lower surface portion that is to be placed on the holding sheet;
    an upper surface portion on a side of the peeling tool opposite to the lower surface portion; and
    an abutting portion that is a leading edge of the peeling tool, that is a surface which intersects a longitudinal direction of the peeling tool, that has a shape which is recessed in an arc forming a curve which is convex when viewing the peeling tool from above, and that abuts an outer peripheral portion of the workpiece, wherein at least part of the upper surface portion is tapered in such a manner that the thickness of the peeling tool gradually decreases toward the abutting portion, wherein the upper surface portion has a width larger than a width of a peeling tape that is to be affixed to the protective sheet and used for peeling off the protective sheet, and is formed of a material that rejects affixing of the peeling tape, and the lower surface portion is formed of a material that rejects affixing of the holding sheet.

2. The peeling tool according to claim 1, wherein the lower surface portion and the upper surface portion are formed as two surfaces intersecting in a thicknesswise direction.

3. A sheet peeling method for peeling off a protective sheet having a diameter substantially the same as a diameter of a plate-shaped workpiece from a second surface of the workpiece with use of a peeling tool, the workpiece having a first surface fixed within an opening of an annular frame through a holding sheet and the second surface to which the protective sheet is affixed, the peeling tool including;
  a lower surface portion that is to be placed on the holding sheet,
  an upper surface portion on a side of the peeling tool opposite to the lower surface portion, and
  an abutting portion that is a leading edge of the peeling tool, that is a surface which intersects a longitudinal direction of the peeling tool, that has a shape which is recessed in an arc forming a curve which is convex when viewing the peeling tool from above, and that abuts an outer peripheral portion of the workpiece, wherein at least part of the upper surface portion is tapered in such a manner that the thickness of the peeling tool gradually decreases toward the abutting portion, the upper surface portion having a width larger than a width of a peeling tape that is to be affixed to the protective sheet and used for peeling off the protective sheet, the upper surface portion being formed of a material that rejects affixing of the peeling tape, the lower surface portion being formed of a material that rejects affixing of the holding sheet, the sheet peeling method comprising:

a workpiece holding step of holding the workpiece fixed to the frame on a chuck table through the holding sheet;

a peeling tool disposing step of disposing, after the workpiece holding step is carried out, the peeling tool at a position nearest to the workpiece held on the chuck table to cover the holding sheet;

a peeling tape affixing step of pressing the peeling tape to be affixed to the protective sheet, over an area ranging from a position on the protective sheet, the position being closer to a center with respect to an outer peripheral edge, to the peeling tool positioned nearest to the workpiece, thereby affixing the peeling tape to the protective sheet; and a peeling step of pulling the peeling tape affixed to the protective sheet in a direction from an outer periphery toward the center of the protective sheet, thereby peeling off the protective sheet from the workpiece, wherein, when the peeling tape is affixed to the protective sheet over a range up to an outermost peripheral portion of the protective sheet, the peeling tape is prevented from sticking to the holding sheet.

4. The sheet peeling method according to claim 3, wherein the lower surface portion and the upper surface portion are formed as two surfaces intersecting in a thicknesswise direction.

5. The sheet peeling method according to claim 3, wherein the thickness of the abutting portion is equal to or smaller than a total thickness of the thickness of the workpiece and a thickness of the protective sheet.

6. The sheet peeling method according to claim 3, wherein the thickness of the abutting portion is equal to or greater than the thickness of the workpiece.

7. A sheet peeling apparatus for peeling off a protective sheet having a diameter substantially the same as a diameter of a plate-shaped workpiece from a second surface of the workpiece, the workpiece having a first surface fixed within an opening of an annular frame through a holding sheet and the second surface to which the protective sheet is affixed, the sheet peeling apparatus comprising:

a chuck table for holding the workpiece on a holding surface thereof through the holding sheet;
  a peeling tool that is to be disposed at a position nearest to the workpiece held on the chuck table to cover the holding sheet;
  a supply unit that supplies a peeling tape to be affixed to the protective sheet;
  a pressing unit that presses the peeling tape over an area ranging from a position on the protective sheet, the position being closer to a center with respect to an outer peripheral edge, to the peeling tool positioned nearest to the workpiece, thereby affixing the peeling tape to the protective sheet; and
  a peeling unit that pulls the peeling tape affixed to the protective sheet, thereby peeling off the protective sheet from the workpiece, wherein the peeling tool includes:
  a lower surface portion that is to be placed on the holding sheet,
  an upper surface portion on a side of the peeling tool opposite to the lower surface portion, and
  an abutting portion that is a leading edge of the peeling tool, that is a surface which intersects a longitudinal direction of the peeling tool, that has a shape which is recessed in an arc forming a curve which is convex when viewing the peeling tool from above, and that abuts an outermost peripheral portion of the workpiece, wherein at least part of the upper surface portion is tapered in such a manner that the thickness of the peeling tool gradually decreases toward the abutting portion, the upper surface portion having a width larger than a width of the peeling tape that is to be affixed to the protective sheet and used for peeling off the protective sheet, the upper surface portion being formed of a material that rejects affixing of the peeling tape,
  the lower surface portion being formed of a material that rejects affixing of the holding sheet, and,
  when the peeling tape is affixed to the protective sheet over a range up to an outermost peripheral portion of the protective sheet, the peeling tape is prevented from sticking to the holding sheet.

8. The sheet peeling apparatus according to claim 7, wherein the lower surface portion and the upper surface portion are formed as two surfaces intersecting in a thicknesswise direction.

* * * * *